(12) United States Patent
Herrera et al.

(10) Patent No.: US 11,190,917 B2
(45) Date of Patent: Nov. 30, 2021

(54) PASSENGER SEAT VOICE COMMUNICATION SYSTEM

(71) Applicant: Safran Seats USA LLC, Gainesville, TX (US)

(72) Inventors: Mario Herrera, Chihuahua (MX); Eduardo Monje, Chihuahua (MX); José Madrigal, Chihuahua (MX); Raúl Flores, Chihuahua (MX)

(73) Assignee: Safran Seats USA LLC, Gainesville, TX (US)

( * ) Notice: Subject to any disclaimer, the term of this patent is extended or adjusted under 35 U.S.C. 154(b) by 29 days.

(21) Appl. No.: 16/642,749

(22) PCT Filed: Aug. 28, 2017

(86) PCT No.: PCT/US2017/048854
§ 371 (c)(1),
(2) Date: Feb. 27, 2020

(87) PCT Pub. No.: WO2019/045674
PCT Pub. Date: Mar. 7, 2019

(65) Prior Publication Data
US 2020/0396576 A1    Dec. 17, 2020

(51) Int. Cl.
*H04W 4/48* (2018.01)
*B64D 11/00* (2006.01)
(Continued)

(52) U.S. Cl.
CPC ......... *H04W 4/48* (2018.02); *B64D 11/00151* (2014.12); *B64D 11/00155* (2014.12);
(Continued)

(58) Field of Classification Search
CPC ........... H04W 4/48; H04W 4/80; H04W 4/42; H04M 1/27475; B64D 11/00155;
(Continued)

(56) References Cited

U.S. PATENT DOCUMENTS 5,808,661 A * 9/1998 Infiesto ................. H04N 7/181
                                                      348/14.01
6,155,519 A * 12/2000 Rajasingham ..... B64D 11/0636
                                                      244/118.6
(Continued)

FOREIGN PATENT DOCUMENTS

| EP | 0926065 A2 | 6/1999 |
| EP | 2866476 A1 | 4/2015 |
| EP | 3168153 A1 | 5/2017 |

OTHER PUBLICATIONS

International Patent Application No. PCT/US2017/048854, International Search Report and Written Opinion, dated Mar. 12, 2018.

(Continued)

*Primary Examiner* — William Nealon
(74) *Attorney, Agent, or Firm* — Kilpatrick Townsend & Stockton LLP

(57) ABSTRACT

A passenger seat voice communication system (100) for a passenger seat of a passenger vehicle includes a first communication device (102A) that supports voice communication. The first communication (102A) device includes a receiver (108) and a video monitor (110). The system includes a second communication device (102B) configured to support voice communication at a second passenger seat. The system also includes a controller (104) that receives from the first communication device (102A) a selection and request to establish voice communication with the second passenger seat, and sends the request to the second communication device (102B). If the request is accepted by the second communication device (102B), the controller (104) establishes voice communication between the first communication device (102A) and the second communication device (102B).

20 Claims, 3 Drawing Sheets

(51) Int. Cl.
  *B64D 11/06* (2006.01)
  *H04W 4/42* (2018.01)
  *H04M 1/27475* (2020.01)
  *G06F 3/16* (2006.01)
  *G06F 3/0482* (2013.01)
  *H04W 4/80* (2018.01)

(52) U.S. Cl.
  CPC ............ *B64D 11/0624* (2014.12); *G06F 3/16* (2013.01); *H04M 1/27475* (2020.01); *H04W 4/42* (2018.02); *H04W 4/80* (2018.02); *G06F 3/0482* (2013.01)

(58) Field of Classification Search
  CPC . B64D 11/0624; B64D 11/00151; G06F 3/16; G06F 3/0482
  See application file for complete search history.

(56) References Cited

U.S. PATENT DOCUMENTS

| | | | |
|---|---|---|---|
| 7,028,304 B1* | 4/2006 | Weinberger | G06Q 10/10 709/227 |
| 9,060,202 B2* | 6/2015 | Mondragon | H04N 21/4781 |
| 2002/0100050 A1 | 7/2002 | Ryberg | |
| 2002/0109647 A1* | 8/2002 | Crandall | B64D 11/00151 345/2.1 |
| 2005/0021602 A1* | 1/2005 | Noel | H04L 49/351 709/203 |
| 2006/0075934 A1* | 4/2006 | Ram | B64D 11/00155 108/44 |
| 2011/0109715 A1 | 5/2011 | Jing et al. | |
| 2014/0282038 A1 | 9/2014 | Royster et al. | |

OTHER PUBLICATIONS

Europe Patent Application No. 17765509.9, Communication pursuant to Article 94(3) EPC (office action), dated May 12, 2021.

* cited by examiner

PASSENGER SEAT VOICE COMMUNICATION SYSTEM

FIELD OF THE INVENTION

This application relates to passenger seats, and more particularly to a voice communication system for passenger seats.

BACKGROUND

Passenger vehicles, such as aircraft, buses, trains, ships, and automobiles, include passenger seats for passengers to sit in and utilize during travel. Most passengers remain seated for the duration of travel. However, sometimes a passenger may wish to communicate with another passenger or a flight attendant. Typically, such communication has required either the passenger or person with whom they wish to communicate to move around the cabin of the passenger vehicle. For example, the passenger may get out of his or her seat to move to the location of the other passenger or flight attendant. Alternatively, the other passenger or flight attendant may move through the cabin to the passenger's seat to communicate with him or her. Such movement and communication during travel can be disruptive for other passengers.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to some examples, a passenger seat voice communication system includes a first communication device configured to support voice communication at a first passenger seat. The first communication device includes a receiver on the first passenger seat that is configured to connect to an input device, receive a microphone signal from the input device, and distribute an audio signal to the input device. The first communication device also includes a video monitor. In some examples, the passenger seat voice communication system includes a second communication device configured to support voice communication at a second passenger seat and an attendant communication device configured to support voice communication at an attendant station. In certain examples, the passenger seat voice communication system includes a controller configured to: provide a contact listing comprising the second passenger seat and the attendant station to the first passenger seat through the video monitor; receive from the first communication device a selection and request to establish voice communication with the second passenger seat or the attendant station; send the request to establish voice communication to the second communication device or attendant communication device based on the selection, and if the request to establish voice communication is accepted by the second communication device or attendant communication device, establish voice communication between the first communication device and the selected second communication device or attendant communication device.

In certain examples, the receiver includes a multi-function jack on the first passenger seat. In some aspects, the receiver includes a wireless receiver on the first passenger seat. In various examples, the wireless receiver is a Bluetooth wireless receiver.

In some cases, the second communication device includes a receiver on the second passenger seat that is configured to connect to a second input device, receive a microphone signal from the second input device, and distribute an audio signal to the second input device. In certain cases, the second communication device includes a video monitor.

In some examples, the controller is configured to display a status message on the video monitor of the first communication device if the request to establish voice communication is declined by the second communication device or attendant station.

In various examples, the passenger seat voice communication system further includes a third communication device configured to support voice communication at a third passenger seat. In certain cases, the controller is further configured to: provide the third passenger seat with the contact listing; receive from the first communication device a selection and request to establish voice communication with the second passenger seat and the third passenger seat; and send the request to establish voice communication to the second communication device and third communication device, and if the request is accepted by the second communication device and third communication device, establish voice communication between the first communication device, second communication device, and third communication device.

In certain cases, the attendant communication device includes a receiver at the attendant station that is configured to connect to an input device, receive a microphone signal from the input device, and distribute an audio signal to the input device. In some aspects, the attendant communication device includes a video monitor.

In various examples, the video monitor of the first communication device is an In-Flight Entertainment monitor.

According to certain examples, a passenger seat voice communication system includes a first passenger seat with a first communication device configured to support voice communication. In some examples, the first communication device includes a receiver on the first passenger seat that is configured to connect to an input device, receive a microphone signal from the input device, and distribute an audio signal to the input device. In certain cases, the first communication device includes a video monitor. The passenger seat voice communication system also includes a second passenger seat with a second communication device configured to support voice communication. In some aspects, the passenger seat voice communication system includes a controller configured to: provide to the first passenger seat a contact listing including the second passenger seat through the video monitor; receive from the first communication device a request to establish voice communication with the second passenger seat; send the request to establish voice communication to the second communication device and if the request to establish voice communication is accepted by the second communication device, establish voice communication between the first communication device and the second communication device.

In various examples, the passenger seat voice communication system further includes a third passenger seat including a third communication device configured to support voice communication, wherein the controller is further configured to: provide the third passenger seat with the contact listing; receive from the first communication device a selection and request to establish voice communication with the second passenger seat and the third passenger seat; and send the request to the second communication device and third communication device and if the request to establish voice communication is accepted by the second communication device and third communication device, establish voice communication between the first communication device, second communication device, and third communication device.

In some examples, the second communication device includes a receiver on the second passenger seat and configured to connect to an input device, receive a microphone signal from the input device, and distribute an audio signal to the input device. In various aspects, the second communication device includes a video monitor.

In certain cases, the receiver includes a multi-function jack on the first passenger seat. In some aspects, the receiver includes a wireless receiver on the first passenger seat. In various cases, the wireless receiver is a Bluetooth wireless receiver.

According to some aspects, a passenger seat assembly includes a passenger seat, a receiver on the passenger seat, and a video monitor associated with the passenger seat. The receiver is configured to: connect to an input device; receive a microphone signal from the input device; and distribute an audio signal to the input device.

In some examples, the receiver includes a multi-function jack on the first passenger seat. In various cases, the receiver includes a wireless receiver on the first passenger seat. In some cases, the wireless receiver is a Bluetooth wireless receiver. In certain examples, the video monitor is an In-Flight Entertainment monitor.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "forward," "aft," "up," "down," "top," "left," "right," "front," and "back," among others are intended to refer to the orientation as illustrated and described in the figure (or figures) to which the components and directions are referencing.

In one aspect, disclosed is a passenger seat voice communication system and associated methods, systems, devices, and various apparatus. The passenger seat voice communication system may be utilized with a passenger seat of a passenger vehicle, such as an aircraft, bus, train, ship, and various other passenger vehicles. It would be understood by one of ordinary skill in the art that the disclosed passenger seat voice communication system is described in but a few exemplary aspects among many.

The passenger seat voice communication system is configured to provide voice communication between passengers in at least two different passenger seats of a passenger vehicle. In some examples, the passenger seat voice communication system provides voice communication between a plurality of passengers at different passenger seats of a passenger vehicle. The passenger seat voice communication system is also configured to provide voice communication between passengers in passenger seats and attendants (e.g., flight attendants) at various flight attendant stations on the passenger vehicle. The passenger seat voice communication system provides real-time and faster social interaction between passengers, promotes natural social interaction between passengers, provides faster attendant service evaluation for the passenger's inquiries during travel, and provides faster attendant service for the passenger's inquiries during travel.

Figure 1:
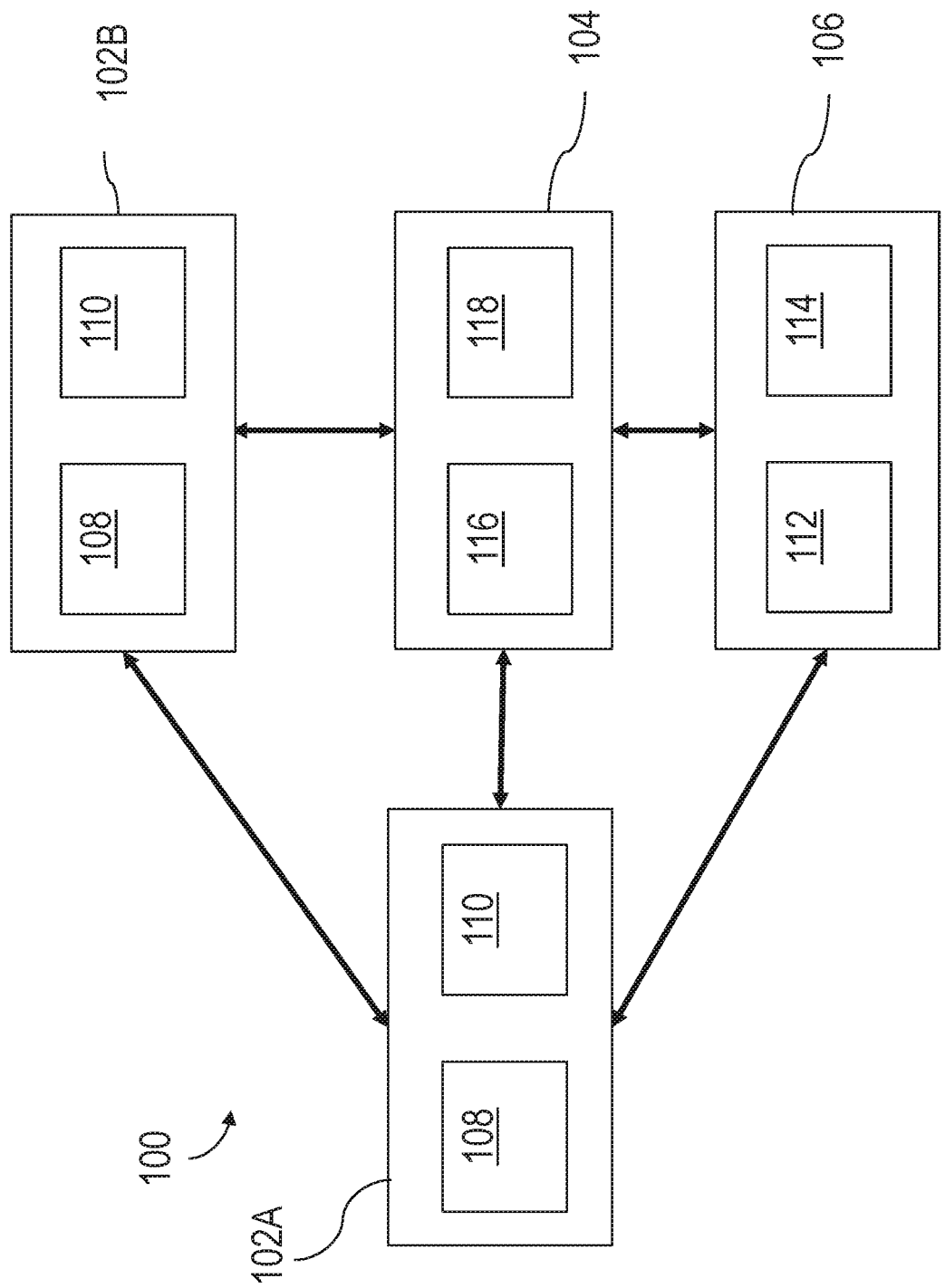
FIG. 1 is a diagram of a passenger seat voice communication system according to aspects of the current disclosure.

FIG. 1 is a diagram of an example of a passenger seat voice communication system 100. As illustrated in FIG. 1, the passenger seat voice communication system 100 includes at least two seat communication devices 102A-B that support voice communication. Each seat communication device 102A-B is provided with a passenger seat 200 (see, e.g., FIG. 2). Although two seat communication devices 102A-B are illustrated, any number of seat communication devices 102A-B may be provided with any number of passenger seats on a passenger vehicle, such as an aircraft. As one non-limiting example, an aircraft may have three passenger seats 200 with each having a seat communication device 102, four passenger seats 200 with each having a seat communication device 102, five passenger seats 200 with each having a seat communication device 102, or any other number of passenger seats 200 and seat communication devices 102. In some examples, the number of seat communication devices 102 is the same as the number of passenger seats 200 on the aircraft, although it need not. For example, in some cases, the number of seat communication devices 102 is less than the number of passenger seats 200 on the aircraft (e.g., less than all of the passenger seats 200 have a seat communication device 102). In various examples, the seat communication devices 102 may be provided for the passenger seats 200 of one section of passenger seats 200 on the aircraft but not another. As one non-limiting example, the seat communication devices 102 may be provided for passenger seats 200 in business class of the aircraft but not for passenger seats in economy class of the aircraft.

Each seat communication device 102A-B includes a receiver 108. In various examples, the receiver 108 is configured to connect to an input device, receive a microphone signal from the input device, and distribute an audio signal to the input device. In some examples, the receiver 108 is configured to physically connect to the input device. In such examples, the receiver 108 includes a multi-function or combination jack that is configured to receive a plug or other suitable connector from the input device to physically connect the input device with the receiver 108 and establish a wired connection. In other examples, the receiver 108 is configured to use wireless communication to connect with the input device. As one non-limiting example, the receiver 108 may be a Bluetooth receiver that is configured to connect with the input device via Bluetooth. The input device may be various suitable combination microphone and headphone devices suitable for connecting to the receiver 108. In various examples, the input device may be devices including, but not limited to plug-in headsets with microphones, wireless headsets, speakers, or various other devices suitable for receiving voice communications from the passenger and distributing audio to the passenger. In some examples, the input device may be provided to the passenger by the passenger vehicle operator (e.g., an airline operating the aircraft), although it need not be.

Figure 2:
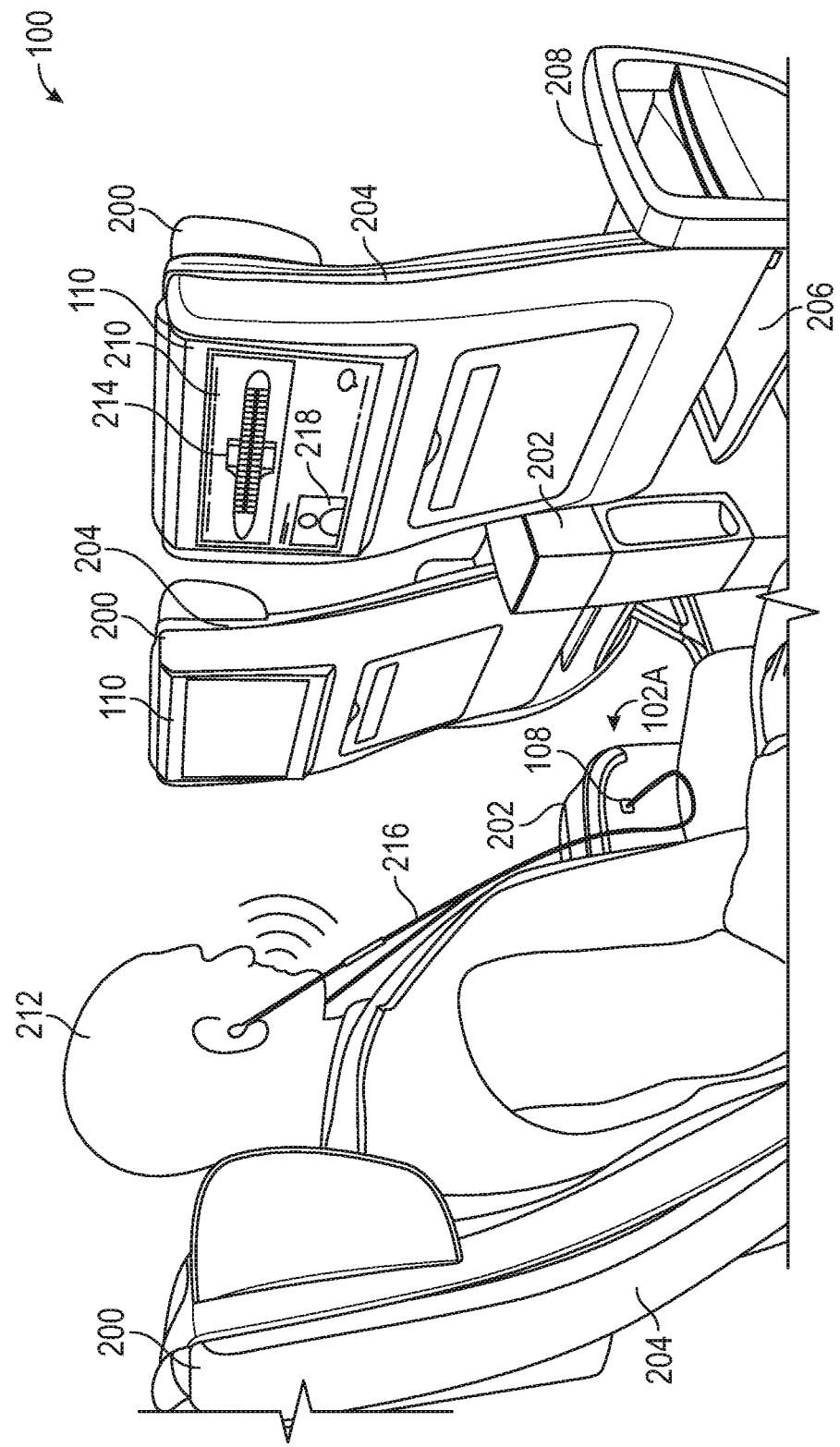
FIG. 2 illustrates some passenger seats of a passenger vehicle with the passenger seat voice communication system of FIG. 1.

As illustrated in FIG. 2, the receiver 108 is on the passenger seat 200. In the example illustrated in FIG. 2, the receiver 108 is on a middle console 202 of the passenger seat 200. In other examples, the receiver 108 may be at various other locations on the passenger seat 200 including, but not limited to, a backrest 204 of the passenger seat 200, a base 206 of the passenger seat 200, an armrest 208 of the passenger seat 200, or various other locations on the passenger seat 200.

Each seat communication device 102A-B also includes a video monitor 110. In some examples, the video monitor 110 is an In-Flight Entertainment (IFE) monitor that provides various IFE to the passenger through an IFE system. In some examples, the video monitor 110 includes a touchscreen user interface (see FIG. 3), although various other types of user interfaces may be used with the video monitor 110.

In various examples, the passenger seat voice communication system 100 also includes an attendant communication device 106 that supports voice communication. In various examples, the attendant communication device 106 is provided at one or more attendant stations on the passenger vehicle. As one non-limiting example where the passenger vehicle is an aircraft, the attendant communication device 106 may be provided at various flight attendant stations including, but not limited to, the forward galley, the aft galley, the crew rest area, and/or various other locations. The number and location of attendant communication devices 106 with the passenger vehicle should not be considered limiting on the current disclosure.

Similar to the seat communication devices 102A-B, the attendant communication device 106 includes a receiver 112. In some examples, similar to the receiver 108, the receiver 112 may be connectable to an input device. In other examples, the components needed for microphone input and audio output may be integrally formed with the receiver 112 such that the input device and receiver 112 are a single component or device. Optionally, in some examples, the attendant communication device 106 includes a video monitor 114, although it need not be included.

In some examples, the passenger seat voice communication system 100 includes a controller 104. In some examples, the controller 104 includes a processor 116, which may be a general purpose computer, special purpose computer, and/or other programmable data processing apparatus, and a memory 118, which stores various instructions that may be executed by the processor 116. The memory 118 is a computer-usable or computer-readable medium that may be any non-transitory medium that is not a transitory signal and can contain or store the program or instructions for use by or in connection with the instruction or execution of a system, apparatus, or device. In some examples, the controller 104 is a central controller; in other examples, the controller 104 comprises a plurality of local controllers at each communication device 102A-B and 106. In some examples, the controller 104 is in wired or wireless communication (e.g., cellular communication, W-Fi, Bluetooth, etc.) with the seat communication devices 102A-B and attendant communication device 106.

Figure 3:
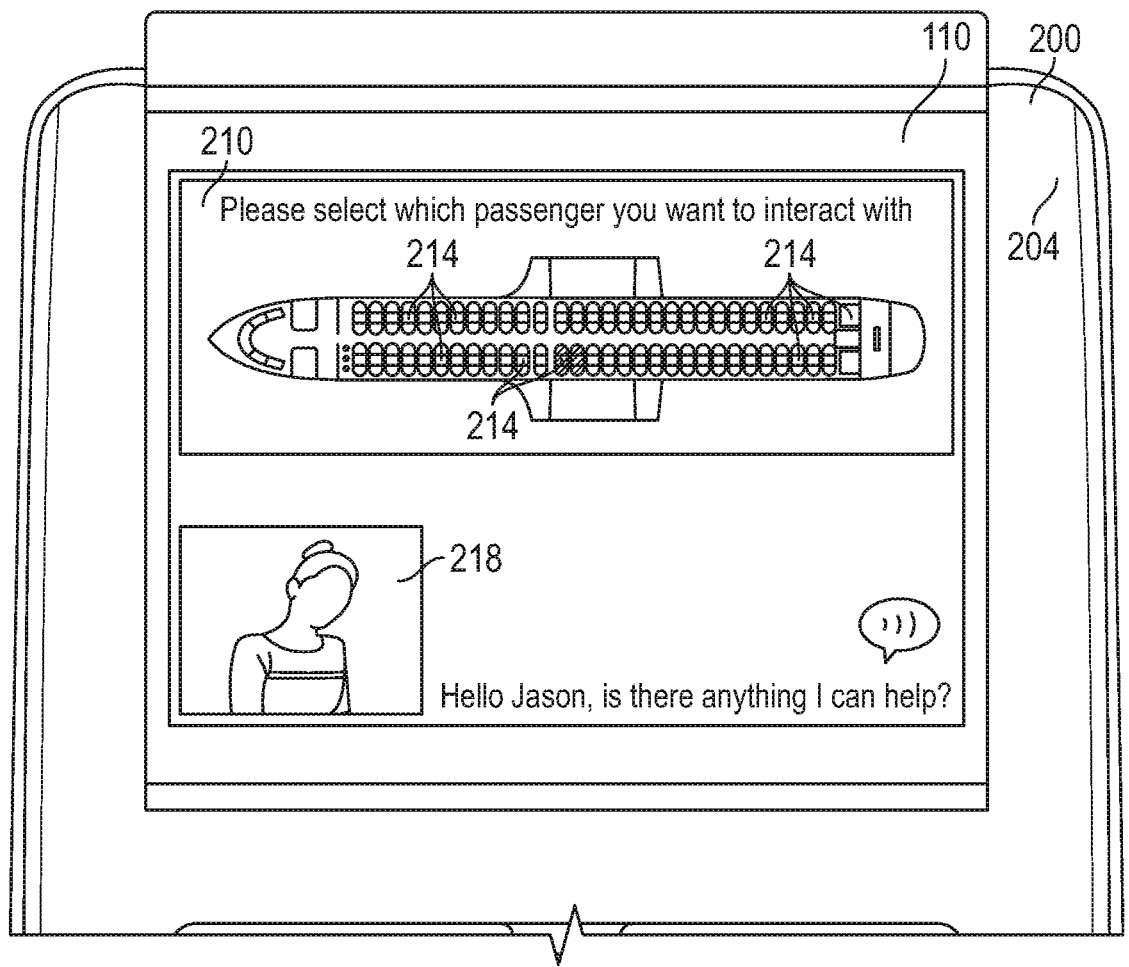
FIG. 3 is an aft view of one of the passenger seats of FIG. 2.

As illustrated in FIGS. 2 and 3, the controller 104 provides a contact list 210 to a passenger 212 of the passenger seat 200 having the seat communication device 102A (or any other seat communication device 102) through the video monitor 110. In various examples, the contact list 210 includes a number of indicators 214, each corresponding to the passenger seats 200 having seat communication devices 102 and/or attendant stations having attendant communication devices 106 on the passenger vehicle. In some examples, the video monitor 110 includes a touchscreen user interface such that the desired indicators 214 may be selected on the video monitor 110 to initiate voice communication as described in detail below. In other examples, various other user interface mechanisms may be provided to select particular seat communication devices 102 and/or attendant communication devices 106 to initiate voice communication. In some examples, the selection of one or more indicators 214 may change at least one characteristic of the selected indicators 214 to provide an indication that the particular passenger seat 200 and/or attendant station has been selected. The at least one characteristic may be a color or shading of the selected indicators 214, a size of the selected indicators 214, a shape of the selected indicators 214, or various other suitable indicators 214.

In various examples, the controller 104 optionally provides an identification 218 of the person or persons with whom the passenger 212 is communicating. In some examples, the identification 218 is a real-time video. In such examples, the communications devices 102 and/or 106 may include a camera or other suitable recording devices and components for capturing the video. In other examples, the identification 218 may be a picture, such as a picture of the particular passenger or attendant, text, or various other suitable identifications of the person or persons with whom the passenger 212 is communicating. In other examples, the identification 218 may be omitted.

Referring to FIGS. 2 and 3, a method of communicating through the passenger seat voice communication system 100 is also disclosed. In the following description, reference is made to the seat communication device 102A communicating with the seat communication device 102B and/or the attendant communication device 106; however, in other examples, various other communication devices 102 and/or attendant communication devices 106 may be utilized.

Referring to FIG. 2, the method includes establishing a connection between the receiver 108 of the seat communication device 102A and an input device 216. In the example illustrated in FIG. 2, the receiver 108 is a multi-function jack, and the input device 216 is a headset with a microphone. In this example, a plug of the input device 216 is inserted into the multi-function jack to establish a physical connection between the input device 216 and receiver 108. In other examples, a wireless connection, such as via Bluetooth, is established between the input device 216 and the receiver 108.

The method also includes providing the contact list 210 to the passenger 212 through the video monitor 110 associated with the passenger seat 200. The contact list 210 includes a plurality of indicators 214. In various examples, at least one indicator 214 corresponds to a passenger seat 200 having the seat communication device 102B and at least one indicator 214 corresponds to the attendant station having the attendant communication device 106. In some examples, the method includes receiving a selection of at least one indicator 214. As one non-limiting example, the passenger 212 may be in seat 23A (having the seat communication device 102A) of an aircraft, and may select the indicator 214 corresponding to the passenger is seat 13D of the aircraft to establish voice communication with that passenger. In certain examples, the method includes receiving a selection of a plurality of indicators 214, which may correspond to a plurality of passenger seats 200 having seat communication devices 102, a plurality of attendant stations having attendant communication devices 106, a passenger seat 200 having the seat communication device 102B and the attendant station having the attendant communication device 106, or any other combination of indicators. In various examples, receiving the selection of at least one indicator 214 includes changing at least one characteristic of the indicator 214.

In various examples, based on the selection of indicators 214, a request to establish voice communication is transmitted to the communication device associated with the selected indicator 214. As one non-limiting example, if the indicator 214 associated with the passenger seat 200 having the seat communication device 102B is selected, a request to establish voice communication is transmitted to the seat communication device 102B. As another non-limiting example, if the indicator 214 associated with the attendant station having the attendant communication device 106 is selected, a request to establish voice communication is transmitted to the attendant communication device 106. In certain cases, transmitting the request to establish voice communication includes providing a prompt or alert on the selected communication device (e.g., the seat communication device 102B and/or attendant communication device 106) corresponding to the request. In various examples, the prompt or alert may be an audible alert, a visual alert (e.g., on a video monitor 110), or various other suitable prompts or alerts.

The method also includes receiving through the seat communication device 102B and/or attendant communication device 106 an acceptance or denial of the request to establish voice communication with the passenger seat 200 having the seat communication device 102A. In some examples, if the request is denied, the method includes providing a status message to the passenger with the seat communication device 102A. The status message may be a message provided on the video monitor 110 and/or an audible message provided to the passenger 212 through the input device 216 indicating that the request for communication was denied. In various examples, if the request is accepted, the method includes establishing voice communication between the seat communication device 102A and the seat communication device 102B and/or the attendant communication device 106.

In certain examples where a request to establish voice communication is transmitted to multiple communication devices, if at least one request is denied, the method may include providing the status message to the passenger with the seat communication device 102A and not establishing voice communication with any of the selected communication devices. In other examples, if at least one request is denied, the method may include providing the status message to the passenger with the seat communication device 102A indicating the passenger seat 200 and/or attendant station that denied the request while establishing voice communication with any of the selected communication devices that accepted the request. In various examples, the method includes terminating voice communication between at least two communication devices upon receiving an indication or selection from at least one of the communication devices to end the voice communication.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A passenger seat voice communication system comprising: a first communication device configured to support voice communication at a first passenger seat, the first communication device comprising: a receiver on the first passenger seat and configured to connect to an input device, receive a microphone signal from the input device, and distribute an audio signal to the input device; and a video monitor; a second communication device configured to support voice communication at a second passenger seat; an attendant communication device configured to support voice communication at an attendant station; and a controller configured to: provide to the first passenger seat a contact listing comprising the second passenger seat and the attendant station through the video monitor; receive from the first communication device a selection and request to establish voice communication with the second passenger seat or the attendant station; send the request to the second communication device or attendant communication device based on the selection, and if the request is accepted by the second communication device or attendant communication device, establish voice communication between the first communication device and the selected second communication device or attendant communication device.

EC 2. The passenger seat voice communication system of any of the preceding or subsequent example combinations, wherein the receiver comprises a multi-function jack on the first passenger seat.

EC 3. The passenger seat voice communication system of any of the preceding or subsequent example combinations, wherein the receiver comprises a wireless receiver on the first passenger seat.

EC 4. The passenger seat voice communication system of any of the preceding or subsequent example combinations, wherein the wireless receiver is a Bluetooth wireless receiver.

EC 5. The passenger seat voice communication system of any of the preceding or subsequent example combinations, wherein the second communication device comprises: a receiver on the second passenger seat and configured to connect to a second input device, receive a microphone signal from the second input device, and distribute an audio signal to the second input device; and a video monitor.

EC 6. The passenger seat voice communication system of any of the preceding or subsequent example combinations, wherein the controller is configured to display a status message on the video monitor if the request is declined by the second communication device or attendant station based on the selection.

EC 7. The passenger seat voice communication system of any of the preceding or subsequent example combinations, further comprising a third passenger seat comprising a third communication device configured to support voice communication, wherein the controller is further configured to: provide the third passenger seat with the contact listing; receive from the first communication device a selection and request to establish voice communication with the second passenger seat and the third passenger seat; and send the request to the second communication device and third communication device and if the request is accepted by the second communication device and third communication device, establish voice communication between the first communication device, second communication device, and third communication device.

EC 8. The passenger seat voice communication system of any of the preceding or subsequent example combinations, wherein the attendant communication device comprises: a receiver on the second passenger seat and configured to connect to a third input device, receive a microphone signal from the third input device, and distribute an audio signal to the third input device; and a video monitor.

EC 9. The passenger seat voice communication system of any of the preceding or subsequent example combinations, wherein the video monitor of the first communication device is an In-Flight Entertainment monitor.

EC 10. A passenger seat voice communication system comprising: a first communication device configured to support voice communication at a first passenger seat, the first communication device comprising: a receiver on the first passenger seat and configured to connect to an input device, receive a microphone signal from the input device, and distribute an audio signal to the input device; and a video monitor; a second communication device configured to support voice communication at a second passenger seat; and a controller configured to: provide to the first passenger seat a contact listing comprising the second passenger seat through the video monitor; receive from the first communication device a request to establish voice communication with the second passenger seat; send the request to the second communication device and if the request is accepted by the second communication device, establish voice communication between the first communication device and the second communication device.

EC 11. The passenger seat voice communication system of any of the preceding or subsequent example combinations, further comprising a third passenger seat comprising a third communication device configured to support voice communication, wherein the controller is further configured to: provide the third passenger seat with the contact listing; receive from the first communication device a selection and request to establish voice communication with the second passenger seat and the third passenger seat; and send the request to the second communication device and third communication device and if the request is accepted by the second communication device and third communication device, establish voice communication between the first communication device, second communication device, and third communication device.

EC 12. The passenger seat voice communication system of any of the preceding or subsequent example combinations, wherein the second communication device comprises: a receiver on the second passenger seat and configured to connect to a second input device, receive a microphone signal from the second input device, and distribute an audio signal to the second input device; and a video monitor.

EC 13. The passenger seat voice communication system of any of the preceding or subsequent example combinations, wherein the receiver comprises a multi-function jack on the first passenger seat.

EC 14. The passenger seat voice communication system of any of the preceding or subsequent example combinations, wherein the receiver comprises a wireless receiver on the first passenger seat.

EC 15. The passenger seat voice communication system of any of the preceding or subsequent example combinations, wherein the wireless receiver is a Bluetooth wireless receiver.

EC 16. A passenger seat assembly comprising: a passenger seat; a receiver on the passenger seat configured to: connect to an input device; receive a microphone signal from the input device; and distribute an audio signal to the input device; and a video monitor associated with the passenger seat.

EC 17. The passenger seat assembly of any of the preceding or subsequent example combinations, wherein the receiver comprises a multi-function jack on the first passenger seat.

EC 18. The passenger seat assembly of any of the preceding or subsequent example combinations, wherein the receiver comprises a wireless receiver on the first passenger seat.

EC 19. The passenger seat assembly of claim 16, wherein the wireless receiver is a Bluetooth wireless receiver.

EC 20. The passenger seat assembly of any of the preceding or subsequent example combinations, wherein the video monitor is an In-Flight Entertainment monitor.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A passenger seat voice communication system comprising:
   a first communication device on a first passenger seat and configured to support voice communication at the first passenger seat, the first communication device comprising:
   a receiver on the first passenger seat and configured to connect to an input device, receive a microphone signal from the input device, and distribute an audio signal to the input device; and
   a video monitor associated with the first passenger seat;

a second communication device on a second passenger seat and configured to support voice communication at the second passenger seat;

an attendant communication device configured to support voice communication at an attendant station; and a controller configured to:

provide to the first passenger seat a contact arrangement comprising a plurality of selectable indicators through the video monitor, wherein at least one selectable indictor is associated with the second passenger seat and at least one selectable indicator is associated the attendant station;

receive from the first communication device a selection and request to establish voice communication with the second passenger seat or the attendant communication device, wherein receiving the selection comprises receiving a selection of at least one of the selectable indicator associated with the second passenger seat or the selectable indicator associated with the attendant station and changing at least one characteristic of the selected indicator on the video monitor;

based on the selection of the second passenger seat, send the request to establish voice communication to the second communication device, and if the request to establish voice communication is accepted by the second communication device:

establish voice communication between the first communication device and the second communication device; and provide an identification of the second passenger seat on the video monitor along with the contact arrangement; and based on the selection of the attendant communication device, send the request to establish voice communication to attendant communication device, and if the request to establish voice communication is accepted by the attendant communication device:

establish voice communication between the first communication device and the attendant communication device; and provide an identification of the attendant communication device on the video monitor along with the contact arrangement.

2. The passenger seat voice communication system of claim 1, wherein the receiver comprises a multi-function jack on the first passenger seat.

3. The passenger seat voice communication system of claim 1, wherein the receiver comprises a wireless receiver on the first passenger seat.

4. The passenger seat voice communication system of claim 3, wherein the wireless receiver is a Bluetooth wireless receiver.

5. The passenger seat voice communication system of claim 1, wherein the second communication device comprises:

a receiver on the second passenger seat and configured to connect to a second input device, receive a microphone signal from the second input device, and distribute an audio signal to the second input device; and a video monitor on the second passenger seat.

6. The passenger seat voice communication system of claim 1, wherein the controller is configured to display a status message on the video monitor if the request is declined by the second communication device or attendant station based on the selection.

7. The passenger seat voice communication system of claim 1, further comprising a third communication device on a third passenger seat and configured to support voice communication at a third passenger seat, wherein the controller is further configured to:

provide the third passenger seat with the contact arrangement to the first passenger seat;

receive from the first communication device a selection and request to establish voice communication with the second passenger seat and the third passenger seat; and send the request to the second communication device and third communication device and if the request is accepted by the second communication device and third communication device, establish voice communication between the first communication device, second communication device, and third communication device.

8. The passenger seat voice communication system of claim 1, wherein the attendant communication device comprises:

a receiver configured to connect to a third input device, receive a microphone signal from the third input device, and distribute an audio signal to the third input device; and a video monitor.

9. The passenger seat voice communication system of claim 1, wherein the video monitor of the first communication device is an In-Flight Entertainment monitor.

10. A passenger seat voice communication system comprising:

a first communication device on a first passenger seat and configured to support voice communication, the first communication device comprising:

a receiver on the first passenger seat and configured to connect to an input device, receive a microphone signal from the input device, and distribute an audio signal to the input device; and a video monitor associated with the first passenger seat;

a second communication device on a second passenger seat and configured to support voice communication; and a controller configured to:

provide to the first passenger seat a contact arrangement through the video monitor comprising a plurality of selectable indicators through the video monitor, wherein at least one selectable indictor is associated with the second passenger seat;

receive from the first communication device a request to establish voice communication with the second passenger seat, wherein receiving the selection comprises receiving a selection of the selectable indicator associated with the second passenger seat and changing at least one characteristic of the selected indicator on the video monitor; and send the request to the second communication device, and if the request is accepted by the second communication device:

establish voice communication between the first communication device and the second communication device, and provide an identification of the second passenger seat on the video monitor along with the contact arrangement.

11. The passenger seat voice communication system of claim 10, further comprising a third passenger seat comprising a third communication device configured to support voice communication, wherein the controller is further configured to:
- provide the third passenger seat with the contact arrangement to the first passenger seat;
- receive from the first communication device a selection and request to establish voice communication with the second passenger seat and the third passenger seat; and
- send the request to the second communication device and third communication device and if the request is accepted by the second communication device and third communication device, establish voice communication between the first communication device, second communication device, and third communication device.

12. The passenger seat voice communication system of claim 10, wherein the second communication device comprises:
- a receiver on the second passenger seat and configured to connect to a second input device, receive a microphone signal from the second input device, and distribute an audio signal to the second input device; and
- a video monitor.

13. The passenger seat voice communication system of claim 10, wherein the receiver comprises a multi-function jack on the first passenger seat.

14. The passenger seat voice communication system of claim 10, wherein the receiver comprises a wireless receiver on the first passenger seat.

15. The passenger seat voice communication system of claim 14, wherein the wireless receiver is a Bluetooth wireless receiver.

16. A passenger seat assembly comprising:
- a first passenger seat comprising a first communication device, the first communication device comprising:
  - a receiver on the first passenger seat configured to:
    - connect to an input device;
    - receive a microphone signal from the input device; and
    - distribute an audio signal to the input device; and
  - a video monitor associated with the first passenger seat;
- a second passenger seat comprising a second communication device on the second passenger seat, the second communication device configured to support voice communication; and
- a controller configured to:
  - provide to the first passenger seat a contact arrangement through the video monitor comprising a plurality of selectable indicators through the video monitor, wherein at least one selectable indictor is associated with the second passenger seat;
  - receive from the first communication device a request to establish voice communication with the second passenger seat, wherein receiving the selection comprises receiving a selection of the selectable indicator associated with the second passenger seat and changing at least one characteristic of the selected indicator on the video monitor; and
  - send the request to the second communication device, and if the request is accepted by the second communication device:
    - establish voice communication between the first communication device and the second communication device, and
    - provide an identification of the second passenger seat on the video monitor along with the contact arrangement.

17. The passenger seat assembly of claim 16, wherein the receiver comprises a multi-function jack on the passenger seat.

18. The passenger seat assembly of claim 16, wherein the receiver comprises a wireless receiver on the passenger seat.

19. The passenger seat assembly of claim 18, wherein the wireless receiver is a Bluetooth wireless receiver.

20. The passenger seat assembly of claim 16, wherein the video monitor is an In-Flight Entertainment monitor.

* * * * *